(No Model.)

F. W. MOOG.
FISHING REEL.

No. 524,341. Patented Aug. 14, 1894.

WITNESSES:
Fred White
Thos. F. Wallace

INVENTOR:
Frederick William Moog,
By his Attorneys,
Arthur E. Draser

UNITED STATES PATENT OFFICE.

FREDERICK WILLIAM MOOG, OF NEW YORK, N. Y., ASSIGNOR TO THE UNITED STATES NET AND TWINE COMPANY, OF SAME PLACE.

FISHING-REEL.

SPECIFICATION forming part of Letters Patent No. 524,341, dated August 14, 1894.

Application filed May 29, 1894. Serial No. 512,869. (No model.)

*To all whom it may concern:*

Be it known that I, FREDERICK WILLIAM MOOG, a citizen of the United States, residing in New York, in the county of New York and State of New York, have invented certain new and useful Improvements in Fishing-Reels, of which the following is a specification.

This invention relates to fishing reels and like devices, and aims to provide certain improvements in articles of this character.

Heretofore fishing reels have been constructed with a rotating spool on which the line is wound, a skeleton frame consisting of side plates embracing the ends of the spool and cross pillars fixing these plates together, and a reel cross-plate connected to the frame by engaging the two bottom pillars thereof, and serving as the medium for attaching the reel to the reel-seat usually provided on the butt of a fishing rod. Various expedients have been employed for fastening the cross-plate to the reel, those most commonly resorted to being the solder connection, made by stamping grooves across the plate and soldering the pillars therein, and the rivet connection, made by riveting staples which embrace the pillars through perforations formed in the plate in such manner that the staples hold the pillars in their grooves.

This invention relates particularly to reel cross-plates and to the connection between these and the pillars of the reel frame.

In carrying out the preferred form of the invention the cross-plate is constructed of a single integral piece of sheet metal having upwardly stamped side lugs embracing the tops of the pillars and constituting on their under faces pillar grooves, and between these lugs central bearing faces embracing the under sides of the pillars for supporting the latter, and intermediate of the pillars the metal of the plate is raised to a position substantially opposite the longitudinal centers of the pillars and halfway between the maximum upward projection of the top lugs and the position of the central bearing lugs; the plate is longitudinally slit to separate the top lugs from the bearing faces, so that when the lugs are properly disposed the pillars can be slid across the plate between these parts, and thereby will be thoroughly embraced by the metal of the plate. To effect a tight joint the metal of the plate is then stamped or pressed against the opposite sides of the pillars, and to insure against lateral movement the metal of the bearing faces is pricked at their under sides into the under side of the pillars.

Figure 1:
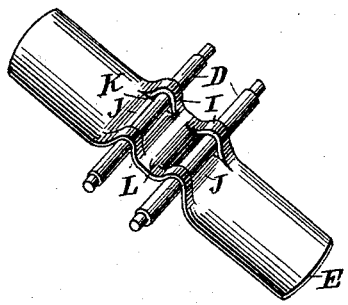
Figure 2:
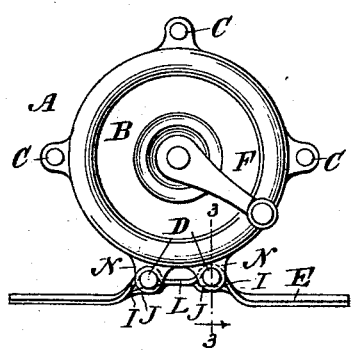
Figure 3:
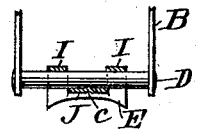
Figure 4:
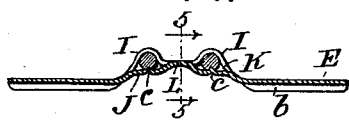
Figure 5:
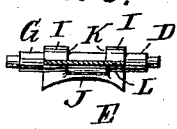
Figure 6:
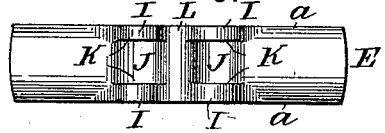
Figure 7:
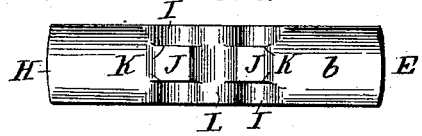

In the accompanying drawings, which illustrate the preferred form of the invention, Figure 1 is a perspective view of a reel cross-plate and the two cross pillars of the frame. Fig. 2 is a side elevation of a reel and its cross-plate fastened together. Fig. 3 is a fragmentary section thereof on the line 3—3 in Fig. 2 and looking in the direction of the arrow. Fig. 4 is a longitudinal mid-section of the plate and the two pillars fixed thereto. Fig. 5 is a cross section thereof on the line 5—5 and looking in the direction of the arrow. Fig. 6 is a plan view of the plate alone, and Fig. 7 a plan view of the under face thereof.

Referring to the drawings let A indicate the reel as a whole, B the side plates of the frame, C the usual cross pillars thereof, D the two bottom pillars, E the cross-plate connected to the latter, and F the usual crank handle of the reel.

The reel and its frame, cross pillars and bottom pillars may be of any suitable construction, the parts shown being constructed according to a well known form of reel. The bottom pillars D have uniform cylindrical bodies G, and reduced ends which pass through ears N of the plates B and are secured thereto by riveting against the outer face of these plates. The cross-plate E is fixedly connected to the centers of the pillars D at its middle, where as usual it is slightly raised, and at its opposite ends it is constructed with convex bottom faces H which engage the reel-seat of a fishing rod and are clamped in position thereon by any suitable fastening device.

According to my invention I stamp the plate E out of a single integral strip of sheet metal, and form it with lugs or straps embracing both the top and bottom sides of the pillars D, so that the latter are completely surrounded by the metal of the plate, and I then fix the plate and pillars firmly together by compressing the straps of the plate against the pillars, and then prick the metal of the plate into the pillars to insure against displacement of the latter longitudinally. Preferably the plate is constructed as shown, with two upwardly stamped straps or lugs I at the side edges of the plate, and a middle bottom strap J between the straps I, and the top of which is sufficiently below the bottoms of the side straps to permit the passage through and under the latter and above the strap J of one of the pillars D. A like series of straps is provided for the other pillar. The plate is slitted at K to permit the separation and proper relative location of the straps and enable the passage of the pillars therebetween.

The straps I are narrow strips of metal rising from the longitudinal edges $a$ of the plate, and have a sharp and extensive curvature corresponding at the tops of their under faces to the shape of the tops of the pillars and embracing substantially half the periphery of the latter. Thus the inner faces of the straps I constitute pillar grooves extending transversely of the plate. The strap J is in each instance preferably a flat extension of the middle portion $b$ of the plate, slightly raised above this portion as shown in Fig. 4, and of substantially twice the width of the side straps. It embraces the under face of its pillar and retains the latter in place under the side straps. Between the pillars the plate has an intermediate portion L, which is preferably elevated to a position substantially midway between the plane of the straps J and the maximum elevation of the straps I. These straps merge up and down respectively to meet this intermediate portion, as seen in Fig. 4. The portion L is not traversed by the slits K, and serves as a solid reinforce between the two series of straps intermediate of the pillars.

Any suitable means for fastening the plate and pillars after the latter are embraced by the straps may be employed, but I prefer to compress the straps against the opposite sides of the pillars until they intimately embrace the latter, to insure a firm, rigid connection between the two, and to insure against possible movement of the pillars longitudinally I prefer to employ some interengaging provisions on the pillars and plate which shall interlock when the straps are compressed home. Any suitable abutting faces or shoulders on the respective parts may be employed for this purpose, but for the sake of simplicity and economy I lock the parts together by pricking the metal of one of the straps into the metal of the adjacent pillars, as shown in Figs. 3 and 4, in which the point $c$ is pricked in the middle of each strap J, thereby indenting the adjoining metal into the under face of the adjacent pillar.

In operation the plates are stamped with the straps sufficiently separated to permit the free passage of the pillars between them. The latter are then placed in position, whereupon the assembled parts are compressed between dies to force the straps tightly against the pillars, and prick the metal of the straps into the pillars. The parts are then firmly and permanently united, and ready to receive the side plates B of the frame.

It will be seen that this invention provides an improved cross-plate for reels which can be employed without the use of solder or rivets, which consists of a single piece of metal, affording a substantial, durable and permanent connection between the plate and reel frame. Material economy results from dispensing with the soldering and riveting heretofore employed, while a stronger and better joint between the plate and pillars is secured.

It will be understood that the invention is not limited to the exact arrangement and construction set forth and illustrated as constituting the preferred form of the invention, as it may be embodied in such modifications as circumstances or the judgment of those skilled in the art may dictate without departing from the essential features of the invention.

What I claim is—

1. A reel cross-plate consisting of a single integral piece of metal having pillar straps for embracing the pillars of a reel frame, said straps disposed, two to embrace one side of the pillar, and the other intermediately thereof and to embrace the other side of the pillar, substantially as and for the purpose set forth.

2. In a fishing reel the pillars of the reel frame in combination with a reel cross-plate consisting of a single piece of metal having straps, the one embracing the top and the other the bottom of said pillars for attaching said plate thereto.

3. In a fishing reel, the pillars and a reel cross-plate embracing said pillars and united thereto by an indentation of the metal of the plate into the pillar.

4. In a fishing reel, the pillars of the frame, and a reel cross-plate consisting of a single integral piece of metal having integral straps embracing the pillars and united thereto by being pressed into intimate contact therewith.

5. In a fishing reel, the pillars of the frame, in combination with a reel cross plate having straps passing on opposite sides of said pillars, and one of said straps embracing its pillar at one point, and two of said straps embracing the opposite side of said pillar at two points equidistant from that at which it is embraced by said first mentioned strap.

6. A fishing reel cross-plate E, having cross narrow side straps I and wide middle strap J, slits K between said straps, and seats H beyond said straps.

7. A reel-cross plate E, having side straps I, and middle strap J at each side of its center, slits K between and separating said straps, and intermediate portion L between said straps, and disposed in a position substantially midway between the plane of the straps J and the maximum elevation of the straps I, substantially as and for the purpose set forth.

In witness whereof I have hereunto signed my name in the presence of two subscribing witnesses.

FREDERICK WILLIAM MOOG.

Witnesses:
JOHN J. TRAPP,
NELLIE TRAPP.